United States Patent
Sharma

(10) Patent No.: US 12,361,607 B2
(45) Date of Patent: Jul. 15, 2025

(54) GENERATING DIGITAL IMAGES IN NEW CONTEXTS WHILE PRESERVING COLOR AND COMPOSITION USING DIFFUSION NEURAL NETWORKS

(71) Applicant: Adobe Inc., San Jose, CA (US)

(72) Inventor: Ashutosh Sharma, Noida (IN)

(73) Assignee: Adobe Inc., San Jose, CA (US)

( * ) Notice: Subject to any disclaimer, the term of this patent is extended or adjusted under 35 U.S.C. 154(b) by 176 days.

(21) Appl. No.: 18/469,900

(22) Filed: Sep. 19, 2023

(65) Prior Publication Data
US 2025/0095230 A1   Mar. 20, 2025

(51) Int. Cl.
*G06T 11/00* (2006.01)
*G06F 16/532* (2019.01)
*G06F 16/583* (2019.01)
*G06N 3/0455* (2023.01)
*G06T 3/40* (2006.01)
*G06T 5/70* (2024.01)
*G06T 7/90* (2017.01)

(52) U.S. Cl.
CPC .......... *G06T 11/001* (2013.01); *G06F 16/532* (2019.01); *G06F 16/5838* (2019.01); *G06N 3/0455* (2023.01); *G06T 3/40* (2013.01); *G06T 5/70* (2024.01); *G06T 7/90* (2017.01); *G06T 2207/10024* (2013.01); *G06T 2207/20084* (2013.01); *G06T 2207/20092* (2013.01); *G06T 2207/20221* (2013.01)

(58) Field of Classification Search
CPC . G06V 10/82; G06T 2207/20084; G06T 5/60; G06T 11/001; G06T 3/40; G06T 5/70; G06T 7/90; G06T 2207/10024; G06T 2207/20092; G06T 2207/20221; G06N 20/00; G06N 3/0455; G06N 3/045; G06F 16/532; G06F 16/5838
See application file for complete search history.

(56) References Cited

U.S. PATENT DOCUMENTS

2024/0161250 A1* 5/2024 Balaji ................. G06T 5/70

\* cited by examiner

*Primary Examiner* — Koosha Sharifi-Tafreshi
(74) *Attorney, Agent, or Firm* — Keller Preece PLLC

(57) ABSTRACT

The present disclosure relates to systems, methods, and non-transitory computer readable media for generating digital images utilizing a diffusion neural network to preserve color harmony and image composition from a sample digital image while modifying image content. In some embodiments, the disclosed systems receive, via user input, a text prompt defining query image content and a sample digital image depicting a color harmony. In some cases, the disclosed systems generate a blurred digital image by blurring pixels of the sample digital image while preserving the color harmony. In some embodiments, the disclosed systems generate, utilizing a diffusion neural network, a modified digital image depicting the query image content having the color harmony of the sample digital image by denoising the blurred digital image toward a noise vector of the text prompt.

20 Claims, 10 Drawing Sheets

GENERATING DIGITAL IMAGES IN NEW CONTEXTS WHILE PRESERVING COLOR AND COMPOSITION USING DIFFUSION NEURAL NETWORKS

BACKGROUND

In the field of digital image editing, generative models have become increasingly effective in various applications, such as producing realistic images from randomly sampled seeds or image inpainting. These models, such as generative adversarial networks ("GANs") and diffusion neural networks, have revolutionized digital image synthesis. Indeed, diffusion neural networks have made significant progress in generating or synthesizing pixels by denoising noise representations to converge on target outputs, such as images reflecting content described in text prompts. Despite the advances of existing digital image systems that utilize these models, however, these conventional systems continue to suffer from a number of disadvantages, such as accuracy in preserving image colors and composition when generating new images from source images.

SUMMARY

This disclosure describes one or more embodiments of systems, methods, and non-transitory computer readable media that solve one or more of the foregoing or other problems in the art by generating digital images utilizing a diffusion neural network to preserve color harmony and image composition from a sample digital image while modifying image content. For example, the disclosed systems generate a blurred digital image from a sample digital image to obscure or obfuscate the content depicted within the image while preserving the image composition and the color harmony of the sample digital image. In some embodiments, the disclosed systems also utilize a diffusion neural network to generate a new or modified digital image from the blurred digital image (e.g., using the blurred digital image as initial noise) by, for example, denoising the blurred digital image toward a new image context (e.g., to depict image content indicated by a text prompt).

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
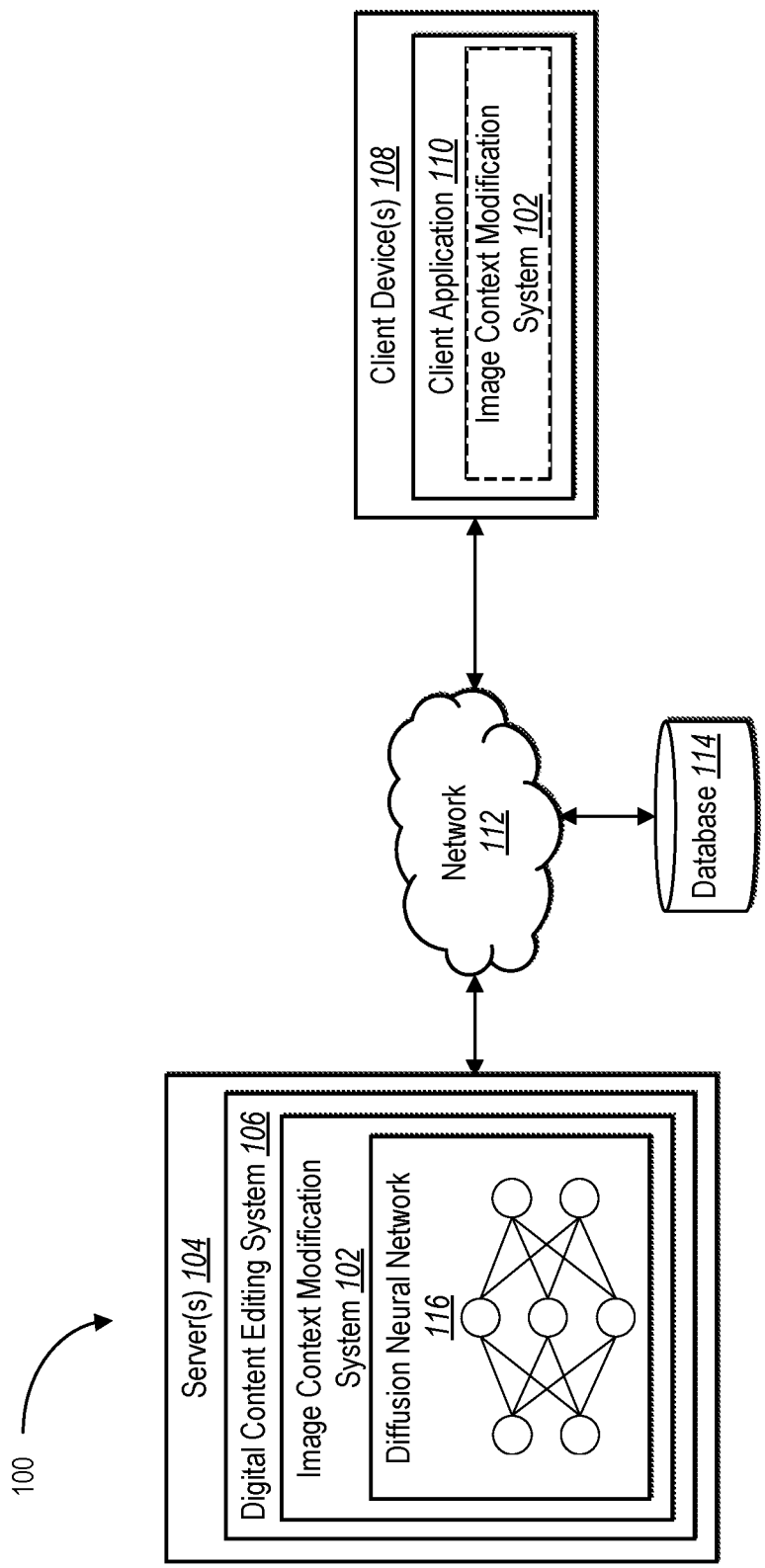
FIG. 1 illustrates an example system environment in which an image context modification system operates in accordance with one or more embodiments.

This disclosure describes one or more embodiments of an image context modification system that generates digital images utilizing a diffusion neural network to preserve color harmony and image composition from a sample digital image while modifying image content. As suggested above, many conventional digital image systems exhibit a number of shortcomings or disadvantages, particularly in their accuracy of preserving color harmony and image composition when generating new images. For example, when generating new or modified digital images using diffusion neural networks, some existing systems generate images that reflect new content with entirely different color schemes and image compositions from sample images. Specifically, existing systems often utilize random (e.g., Gaussian) noise vectors to denoise using diffusion neural network, which results in inaccuracies (or an inability) to preserve color harmony and/or image composition from a sample image. Consequently, some existing systems generate new or modified digital images that do not preserve color harmony or image composition from a sample or source image.

Due at least in part to their inability to preserve color harmony and/or image composition, some existing digital image systems further generate or produce inaccurate image search results. Indeed, while many existing systems perform image-based searches using digital images (or extracted image features) as part of the search parameters, these systems often inaccurately identify images that do not match or resemble a color harmony and/or an image composition of a sample digital image used to initiate the search. For example, many image-based search systems generate search results based on content (e.g., objects or subject matter) depicted within a sample image, and the corresponding search results thus reflect images within a wide array of color schemes and compositions.

As mentioned above, in some embodiments the image context modification system described herein generates digital images utilizing a diffusion to neural network to change image content while preserving color harmony and image composition. For example, the image context modification system generates a blurred digital image from a sample digital image by blurring or obfuscating image content while preserving the color harmony (e.g., the color scheme and color placement) and the image composition (e.g., the arrangement of image elements) of the sample digital image. In some cases, the image context modification system utilizes a blurring process or blur function that obscures the image content (e.g., what the elements or objects in the image actually depict or represent) while retaining color themes across regions of the digital image, as well as retaining the arrangement of visual elements within the digital image.

In some embodiments, the image context modification system utilizes the blurred digital image as input into a diffusion neural network. For example, the image context modification system utilizes a diffusion neural network to process the blurred digital image as initial noise from which to extract or generate a new or modified digital image. In some cases, the image context modification system thus applies a diffusion neural network to denoise the blurred digital image to, over the iterations of the diffusion process, generate a digital image that depicts new content in context entirely different from that of the sample digital image while still retaining the color harmony (e.g., the color themes used in different regions or portions of the sample digital image) and the image composition (e.g., the arrangement, size, and shape of visual elements) from the sample digital image. In certain embodiments, the image context modification system utilizes the diffusion neural network to denoise the blurred digital image toward (e.g., to ultimately depict) image content indicated by a text prompt received from a client device. Thus, using a sample digital image depicting content in one context, in some implementations, the image context modification system generates a modified digital image or a new digital image depicting content in an entirely new context while still reflecting certain aesthetic motifs or themes from the sample image.

In some embodiments, the image context modification system further performs a visual image search using a generated digital image. For example, the image context modification system searches a repository of digital images to identify digital images that reflect or resemble a color harmony and/or an image composition of a generated digital image (and/or of a sample digital image). In some cases, the image context modification system identifies images for a search result by determining which stored images match a color harmony and/or an image composition as well as a search query indicating a particular image content or context.

As suggested above, embodiments of the image context modification system provide a variety of improvements or advantages over conventional digital image systems. For example, embodiments of the image context modification system improve accuracy over prior systems. Indeed, while some prior systems denoise random vectors for inaccurate (or impossible) preservation of color harmony and/or image composition, the image context modification system utilizes a particular image generation process that preserves color harmony and image composition when generating digital images. For example, the image context modification system generates an intermediate, blurred digital image from a sample digital image using a blur function that obscures image content while retaining color harmony and image composition, and the image context modification system further uses the blurred digital image as initial noise for a diffusion neural network. As a result, the image context modification system generates digital images by denoising the blurred digital image for new image content having the same color themes and visual element arrangement as a sample image.

Due to its improvements in accurately preserving color harmony and image composition, in some embodiments, the image context modification system further improves image-based searches. Indeed, as opposed to prior systems that generate image-based search results that include images depicting many different color harmonies across a variety of image compositions, the image context modification system uses a searching process based on color harmony and image composition for a generated image (or a sample image). For instance, the image context modification system compares regions of images using an image grid to match colors and compositions in corresponding grid coordinates across the images. Accordingly, the image context modification system generates more accurate search results that include digital images which not only reflect content indicated by a search query but that also portray color harmonies and image compositions of a generated digital image (or a sample digital image).

Additional detail regarding the image context modification system will now be provided with reference to the figures. For example, FIG. 1 illustrates a schematic diagram of an example system environment 100 for implementing an image context modification system 102 in accordance with one or more embodiments. An overview of the image context modification system 102 is described in relation to FIG. 1. Thereafter, a more detailed description of the components and processes of the image context modification system 102 is provided in relation to the subsequent figures.

As shown, the environment includes server(s) 104, a client device 108, a database 114, and a network 112. Each of the components of the environment communicate via the network 112, and the network 112 is any suitable network over which computing devices communicate. Example networks are discussed in more detail below in relation to FIG. 10.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 10. The client device 108 communicates with the server(s) 104 via the network 112. For example, the client device 108 provides information to server(s) 104 indicating client device interactions (e.g., digital image selections, text prompts for generating digital images, search queries, or other input) and receives information from the server(s) 104 such as generated digital images and search results. Thus, in some cases, the image context modification system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as sample (e.g., captured, uploaded, or un-modified) digital images, generated (e.g., new or modified) digital images, and/or search results. In some cases, the client application 110 includes all or part of the image context modification system 102 and/or the diffusion neural network 116.

As illustrated in FIG. 1, the environment includes the server(s) 104. The server(s) 104 generates, tracks, stores, processes, receives, and transmits electronic data, such as image generating inputs (e.g., text prompts), sample digital images, generated digital images, and/or search results. For example, the server(s) 104 receives data from the client device 108 in the form of an indication of a client device interaction (e.g., a text prompt) to generate a digital image. In response, the server(s) 104 transmits data to the client device 108 to cause the client device 108 to display or present a generated digital image based on the client device interaction.

In some embodiments, the server(s) 104 communicates with the client device 108 to transmit and/or receive data via the network 112, including client device interactions, image generation requests, digital images, and/or other data. In some embodiments, the server(s) 104 comprises a distributed server where the server(s) 104 includes a number of server devices distributed across the network 112 and located in different physical locations. The server(s) 104 comprise a content server, an application server, a communication server, a web-hosting server, a multidimensional server, a container orchestration server, or a machine learning server. The server(s) 104 further access and utilize the database 114 to store and retrieve information such as stored digital images, sample digital images, generated digital images, all or part of the diffusion neural network 116, and/or other data.

As further shown in FIG. 1, the server(s) 104 also includes the image context modification system 102 as part of a digital content editing system 106. For example, in one or more implementations, the digital content editing system 106 is able to store, generate, modify, edit, enhance, provide, distribute, and/or share digital content, such as digital images. For example, the digital content editing system 106 provides tools for the client device 108, via the client application 110, to generate digital images utilizing the diffusion neural network 116.

In one or more embodiments, the server(s) 104 includes all, or a portion of, the image context modification system 102. For example, the image context modification system 102 operates on the server(s) to generate and provide digital images. In some cases, the image context modification system 102 utilizes, locally on the server(s) 104 or from another network location (e.g., the database 114), a diffusion neural network 116 to generate digital images. In addition, the image context modification system 102 includes or communicates with a diffusion neural network 116 for implementation and training.

In certain cases, the client device 108 includes all or part of the image context modification system 102. For example, the client device 108 generates, obtains (e.g., downloads), or utilizes one or more aspects of the image context modification system 102 from the server(s) 104. Indeed, in some implementations, as illustrated in FIG. 1, the image context modification system 102 is located in whole or in part on the client device 108. For example, the image context modification system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the image context modification system 102. For example, in some embodiments, the server(s) 104 train one or more neural networks discussed herein and provide the one or more neural networks to the client device 108 for implementation. In some embodiments, the server(s) 104 train one or more neural networks, the client device 108 request image edits, the server(s) 104 generate modified digital images utilizing the one or more neural networks. Furthermore, in some implementations, the client device 108 assists in training one or more neural networks.

Although FIG. 1 illustrates a particular arrangement of the environment, in some embodiments, the environment has a different arrangement of components and/or may have a different number or set of components altogether. For instance, as mentioned, the image context modification system 102 is implemented by (e.g., located entirely or in part on) the client device 108. In addition, in one or more embodiments, the client device 108 communicates directly with the image context modification system 102, bypassing the network 112. Further, in some embodiments, the diffusion neural network 116 includes one or more components stored in the database 114, maintained by the server(s) 104, the client device 108, or a third-party device.

Figure 2:
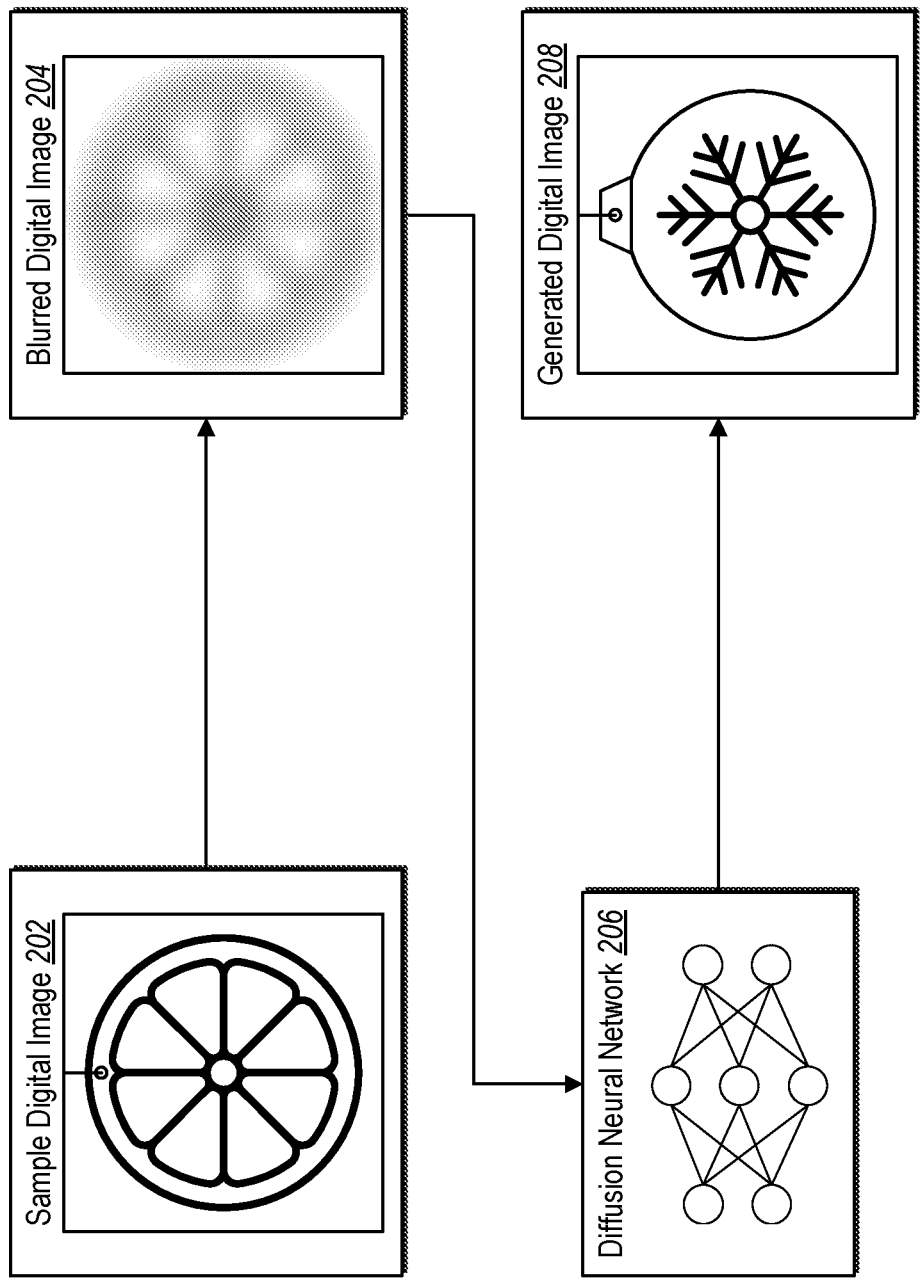
FIG. 2 illustrates an overview of generating a digital image utilizing a diffusion neural network to preserve color harmony and image composition in accordance with one or more embodiments.

As mentioned, in one or more embodiments, the image context modification system 102 generates a digital image from a sample digital image to change the image content while preserving color harmony and image composition. In particular, the image context modification system 102 generates a modified digital image by utilizing a diffusion neural network to denoise a blurred digital image generated from a sample digital image. FIG. 2 illustrates an overview of generating a digital image using a diffusion neural network to change image content while preserving color harmony and image composition in accordance with one or more embodiments. Additional detail regarding the various acts and processes mentioned with respect to FIG. 2 is provided thereafter with respect to subsequent figures.

As illustrated in FIG. 2, the image context modification system 102 accesses or receives a sample digital image 202. For example, the image context modification system 102 receives an upload of the sample digital image 202 from a client device. As another example, the image context modification system 102 receives a selection of the sample digital image 202 from among digital images stored in an image repository (e.g., a repository of images for an image-based search). In some cases, the image context modification system 102 generates the sample digital image 202 from a source image. For instance, the image context modification system 102 crops the source image in response to user input within an image editing interface and/or based on detecting an object and its surroundings (e.g., within a threshold number of pixels in each direction) within the source image. As shown, the sample digital image 202 is an image of a cross-section of a citrus fruit, such as an orange or a grapefruit.

As further illustrated in FIG. 2, the image context modification system 102 generates a blurred digital image 204 from the sample digital image 202. More specifically, the image context modification system 102 generates the blurred digital image 204 by applying a blur function to the sample digital image 202. For example, the image context modification system 102 blurs the sample digital image 202 by blurring pixels by a certain degree. In some cases, the image context modification system 102 blurs the sample digital image 202 by smoothing the color transition between pixels and/or by smoothing the transition between background pixels and foreground object pixels. For instance, the image context modification system 102 generates the blurred digital image 204 by applying the blur kernel to an image matrix of the sample digital image 202. In some embodiments, the image context modification system 102 generates the blurred digital image 204 to obscure or obfuscate the content of the sample digital image 202 (e.g., the indication that the sample digital image 202 portrays a cross-section of a citrus fruit, with its individual segments) while preserving or retaining the color harmony and the image composition of the sample digital image 202 (which are thus both reflected in the blurred digital image 204).

In some embodiments, image content includes or refers to observable or detectable subject matter depicted within a digital image. For example, image content includes subject matter defining a context of a digital image and/or indicating identities or types of objects depicted in the digital image, such as the cross-section of a citrus fruit, a downtown skyline, an automobile, a portrait of a particular person, or some other specific object/subject matter indications. In these or other embodiments, color harmony includes or refers to a set of colors, color themes, or color palettes used throughout a digital image. For example, a color harmony refers to colors and their corresponding locations as they appear within various regions of a digital image. Along these lines, in certain embodiments, image composition includes or refers to an arrangement of visual elements within a digital image. For example, an image composition includes a geometric layout of pixel coordinates associated with objects or shapes shown in a digital image (but not defining the subject matter or the actual objects themselves).

As further illustrated in FIG. 2, the image context modification system 102 utilizes a diffusion neural network 206 to generate or produce a generated digital image 208. For example, the image context modification system 102 inputs the blurred digital image 204 into the diffusion neural network 206 whereupon the diffusion neural network 206 generates the generated digital image 208 from the blurred digital image 204. In some cases, the generated digital image 208 refers to a modified digital image that reflects or preserves certain aspects of the sample digital image 202 (or of the blurred digital image 204), such as a color harmony and/or an image composition but in a new context, reflecting new content (e.g., different types of objects than are shown in the sample digital image 202). In these or other cases, the generated digital image 208 refers to a new digital image that includes entirely new pixels generated to depict entirely new content while matching a color harmony and an image composition of the sample digital image 202.

In some embodiments, a neural network includes or refers to a machine learning model that is trainable and/or tunable based on inputs to generate predictions, determine classifications, or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network includes a deep neural network, a convolutional neural network, a recurrent neural network (e.g., an LSTM), a graph neural network, a transformer, or a generative neural network (e.g., a generative adversarial neural network or a diffusion neural network).

Along these lines, a diffusion neural network includes or refers to a type of generative neural network that utilizes a process involving diffusion and denoising to generate a digital image. For example, the image context modification system 102 provides a diffusion neural network 206 with a digital image representation (e.g., the blurred digital image 204), whereupon the diffusion neural network 206, through its diffusion layers, adds noise to the digital image representation to generate a noise map or inversion (e.g., a representation of the digital image with added noise). In addition, the image content modification system 102 utilizes the architecture of the diffusion neural network 206 (e.g., a plurality of denoising layers that remove noise or recreate a digital image) to generate a digital image (e.g., the generated digital image 208) from the noise map/inversion. In some implementations, the diffusion neural network 206 utilizes a conditioning mechanism to condition the denoising layers for adding edits or modifications in generating a digital image from the noise map/inversion. For example, a conditioning mechanism includes a computer-implemented model (e.g., a conditioning encoder that utilizes a neural network encoding architecture) that generates or utilizes feature representations of desired changes or edits that are utilized by denoising layers to generate a modified digital image. In some cases, a conditioning mechanism utilizes a conditioning encoder such as a vision-language machine learning model to generate an encoding that is utilized in denoising layers to generate a modified/inpainted digital image (e.g., to denoise toward the encoding). Thus, conditioning sometimes includes utilizing these feature representations (e.g., concatenating or combining feature representations with representations generated by the denoising layers) with the layers to generate a modified/inpainted digital image. A diffusion neural network encompasses a variety of diffusion architectures, including a deterministic forward diffusion model or denoising diffusion implicit model. Example architectures include DALL-E, stable diffusion, MIDJOURNEY, or ADOBE FIREFLY. In or more implementations, image context modification system 102 utilizes a diffusion neural network as described by U.S. patent application Ser. No. 18/363,980 filed on Aug. 2, 2023 or as described by U.S. patent application Ser. No. 18/308, 017 filed Apr. 27, 2023, the entire contents of the foregoing patent applications are hereby incorporated by reference. In one or more implementations, the diffusion neural network is a latent space diffusion model. In one or more alternative implementations, the diffusion neural network is a pixel space diffusion model.

In some embodiments, the image context modification system 102 utilizes the blurred digital image 204 as initial noise for the diffusion neural network 206. Indeed, the image context modification system 102 utilizes the diffusion neural network 206 to denoise the blurred digital image 204 to produce the generated digital image 208. In some cases, the diffusion neural network 206 denoises the blurred digital image 204 according to a conditioning encoder that encodes a text prompt, such that the generated digital image 208 ultimately reflects content indicated by the text prompt. In some embodiments, a text prompt includes or refers to a text-based description or set of parameters for generating or searching digital images. For example, a text prompt includes text input via a client device that defines image content to present within one or more digital images.

As shown, the generated digital image 208 reflects a holiday ornament having the same color harmony as the sample digital image 202 (with color themes matching in regions throughout the image) as well as the same image composition (with similar shapes and placements of visual elements, such as the overall circle shape). Indeed, by preserving color harmony, the image context modification system 102 ensures similar aesthetic schemes and color themes for generated images, maintaining a look and feel of an image deliberately curated by a graphic designer. By preserving image composition, the image context modification system 102 similarly preserves locations for visual elements, such as text, objects, or other elements deliberately placed by a graphic designer for aesthetic or functional purposes.

Figure 3:
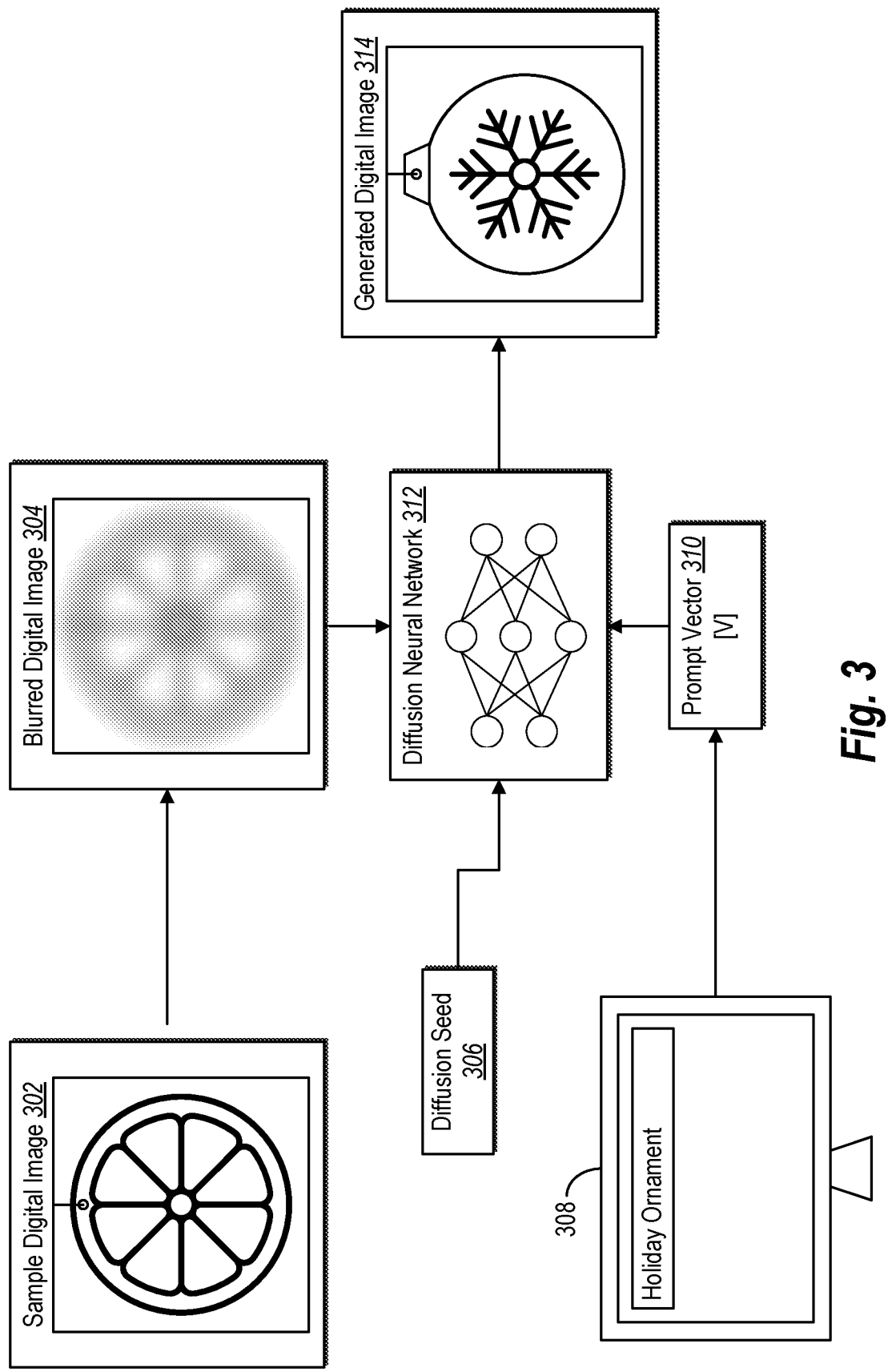
FIG. 3 illustrates an example diagram of generating a digital image from a sample digital image and a text prompt in accordance with one or more embodiments.

As just mentioned, in some embodiments, the image context modification system 102 generates digital images using a diffusion neural network to not only preserve color harmony and image composition of a sample digital image, but also to reflect content indicated by a text prompt. In particular, the image context modification system 102 receives a text prompt from a client device and generates a digital image to reflect content indicated by the text prompt while still retaining a color harmony and/or an image composition of a sample digital image. FIG. 3 illustrates an example diagram for generating a digital image using a sample digital image and a text prompt in accordance with one or more embodiments.

As illustrated in FIG. 3, the image context modification system 102 identifies or receives a sample digital image 302. For example, the image context modification system 102 receives an upload of the sample digital image 302 or a selection of the sample digital image 302 from a client device. In addition, the image context modification system 102 generates a blurred digital image 304 from the sample digital image 302. As shown, the image context modification system 102 generates the blurred digital image 304 by blurring pixels of the cross-section of the citrus fruit depicted in the sample digital image 302 (e.g., using a blur kernel).

As further illustrated in FIG. 3, the image context modification system 102 receives a text prompt from a client device 308 (e.g., the client device 108). As shown, the image context modification system 102 receives a text prompt of "Holiday Ornament" to request generation or searching of digital images depicting holiday ornaments. As mentioned, in conjunction with the text prompt, the image context modification system 102 also receives the sample digital image 302 (and generates the corresponding blurred digital image 304). The image context modification system 102 thus ultimately generates a generated digital image 314 that reflects a holiday ornament (e.g., the content indicated by the text prompt) having the color harmony and/or the image composition of the sample digital image 302.

To generate the generated digital image 314, the image context modification system 102 utilizes a diffusion neural network 312 to process the blurred digital image 304 along with a prompt vector 310. Indeed, the image context modification system 102 generates or extracts the prompt vector 310 as a noise vector from the text prompt for processing by the diffusion neural network 312. For instance, the image context modification system 102 utilizes a conditioning encoder (e.g., an encoder neural network that is part of, or separate from, the diffusion neural network 312) to encode the prompt vector 310 (e.g., a latent vector representation of the text prompt) from the text prompt. Thus, the diffusion neural network 312 utilizes the prompt vector 310 as a guide or a condition for denoising the blurred digital image 304. In some cases, the diffusion neural network 312 denoises the blurred digital image 304 in a vector-space direction toward the prompt vector 310 to ultimately produce pixels of the generated digital image 314.

As also illustrated in FIG. 3, the image context modification system 102 receives or determines a diffusion seed 306. In particular, the image context modification system 102 receives or generates the diffusion seed 306 as a (random) number. In some cases, a diffusion seed includes or refers to a number that initializes the generation, diffusion, or denoising process of the diffusion neural network 312. For example, the diffusion seed 306 is a number that, when controlled, results in reproducible images generated by the diffusion neural network 312 and allows for testing of other parameters, such as blurring sample digital images and variations in text prompts to generate different digital images. Based on modifying the diffusion seed 306, the diffusion neural network 312 generates an entirely new digital image different from images generated using other seeds. In some cases, even slight modifications to a diffusion seed having nine digits will result in vastly different images (while still adhering to the text prompt as well as the color harmony and the image composition extracted from the blurred digital image 304). In certain embodiments, the diffusion seed causes perturbations to the blurred digital image 304 as part of the denoising process of the diffusion neural network 312, where different seeds result in different perturbations and therefore different outputs in the end.

Figure 4:
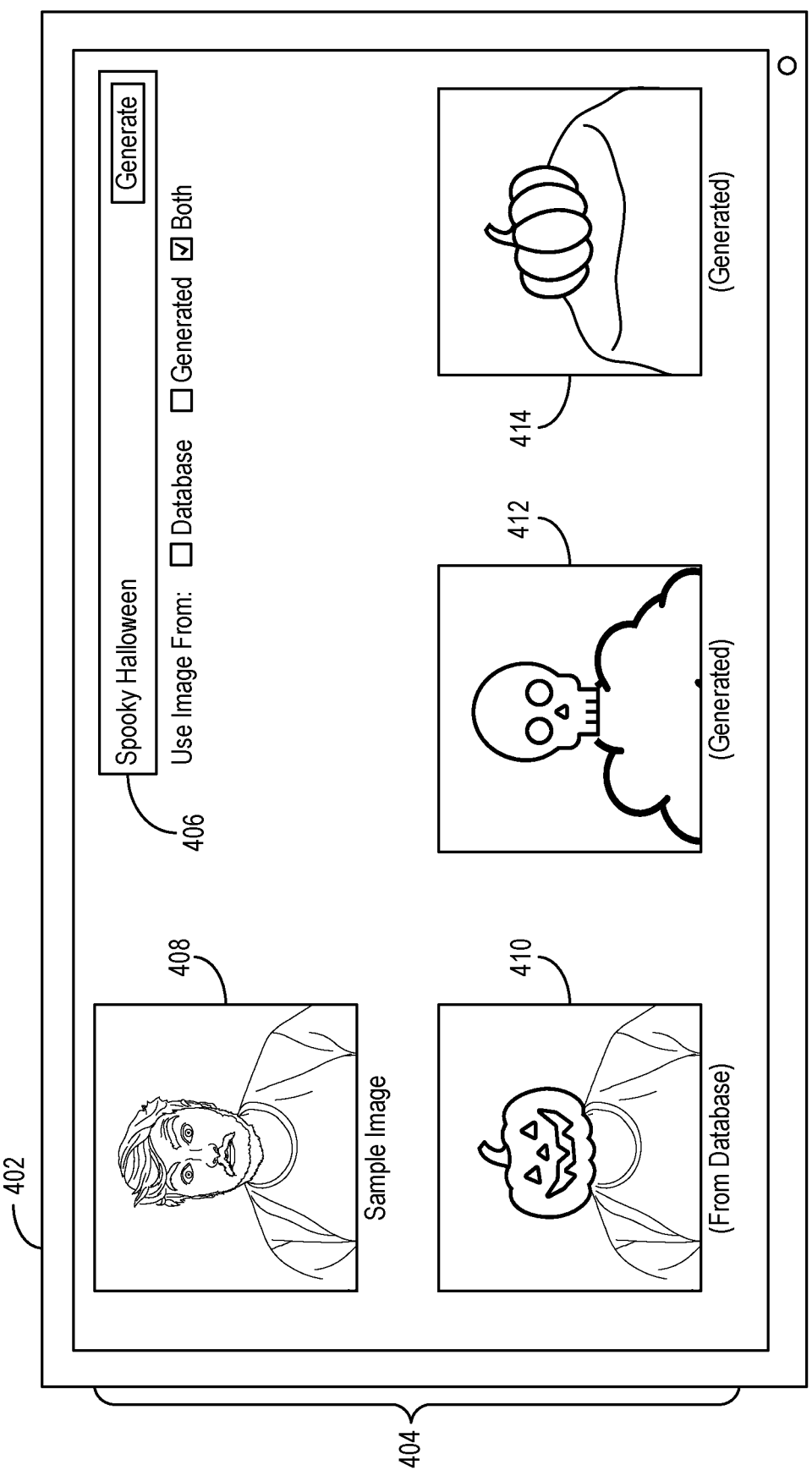
FIG. 4 illustrates an example graphical user interface for generating and searching digital images for based on color harmony and image composition in accordance with one or more embodiments.

As mentioned above, in certain described embodiments, the image context modification system 102 generates new or modified digital images using a diffusion neural network to match color harmony and image composition of a sample image. In particular, the image context modification system 102 generates or identifies images (e.g., from a database) that reflect a color harmony and an image composition of a sample digital image while reflecting content indicated by a text prompt. FIG. 4 illustrates an example image generation interface for generating and searching images in accordance with one or more embodiments.

As illustrated in FIG. 4, the client device 402 displays an image generation interface 404 that includes various images and elements for generating and searching digital images based on a sample digital image 408 and a text prompt 406. Indeed, the image context modification system 102 receives the text prompt 406 from the client device 402 in the form of a string of text characters defining content or subject matter depicted within newly generated or stored digital images. The image context modification system 102 further receives an indication of user input selecting options for generating new digital images for the text prompt 406, searching a database for images based on the text prompt 406, or both.

Not only does the image context modification system 102 generate or search digital images based on the text prompt 406, but the image context modification system 102 further does so based on the sample digital image 408. To elaborate, the image context modification system 102 receives or identifies the sample digital image 408 based on an upload from the client device 402 or a selection via the client device 402 of an image from an image repository. The image context modification system 102 thus utilizes the sample digital image 408 as the basis for searching and/or generating additional digital images that resemble the same color harmony and image composition.

As further illustrated in FIG. 4, the image generation interface 404 includes three digital images identified or generated based on the sample digital image 408 and the text prompt 406. Particularly, the image generation interface 404 includes a searched digital image 410, a generated digital image 412, and a generated digital image 414. To identify the searched digital image 410, the image context modification system 102 performs an image search to search a digital image database for digital images that match a color harmony and/or an image composition of the sample digital image 408.

For example, the image context modification system 102 generates a blurred digital image from the sample digital image 408 and utilizes the blurred digital image to define search parameters for color harmony and image composition. Additionally, the image context modification system 102 searches the image database according to the text prompt 406 as well, identifying digital images that depict content indicated by the text prompt while resembling the color harmony and the image composition of the sample digital image 408 (or the blurred digital image). In some cases, the image context modification system 102 performs a visual image search by first generating a modified digital image using a diffusion neural network (e.g., to match the indicated content from the text prompt 406 and the color harmony and image composition of the sample digital image 408) and then utilizing the modified digital image for a visual-based image search. For instance, the image context modification system 102 utilizes the generated digital image 412 or the generated digital image 414 as the basis for a visual image search to search based on visual appearance and identify similar images. As shown, the searched digital image 410 resembles a color harmony and an image composition of the sample digital image 408 but in a different context, depicting spooky Halloween content.

To generate the generated digital image 412, the image context modification system 102 utilizes a diffusion neural network to denoise a blurred digital image generated from the sample digital image 408. Specifically, the image context modification system 102 denoises the blurred digital image toward a prompt vector encoded for the text prompt 406. For example, the image context modification system 102 extracts a prompt vector for "Spooky Halloween" and denoises a blurred digital image reflecting the color harmony and image composition of the sample digital image 408 to generate the generated digital image 412. Additionally, to generate the generated digital image 414, the image context modification system 102 performs a similar process but based on a different diffusion seed. Indeed, the image context modification system 102 modifies the diffusion seed to generate different digital images from the same text prompt 406 and the same sample digital image 408. As shown, the generated digital image 412 and the generated digital image 414 each depict content indicated by the text prompt 406 while also reflecting the color harmony and the image composition of the sample digital image 408.

Figure 5:
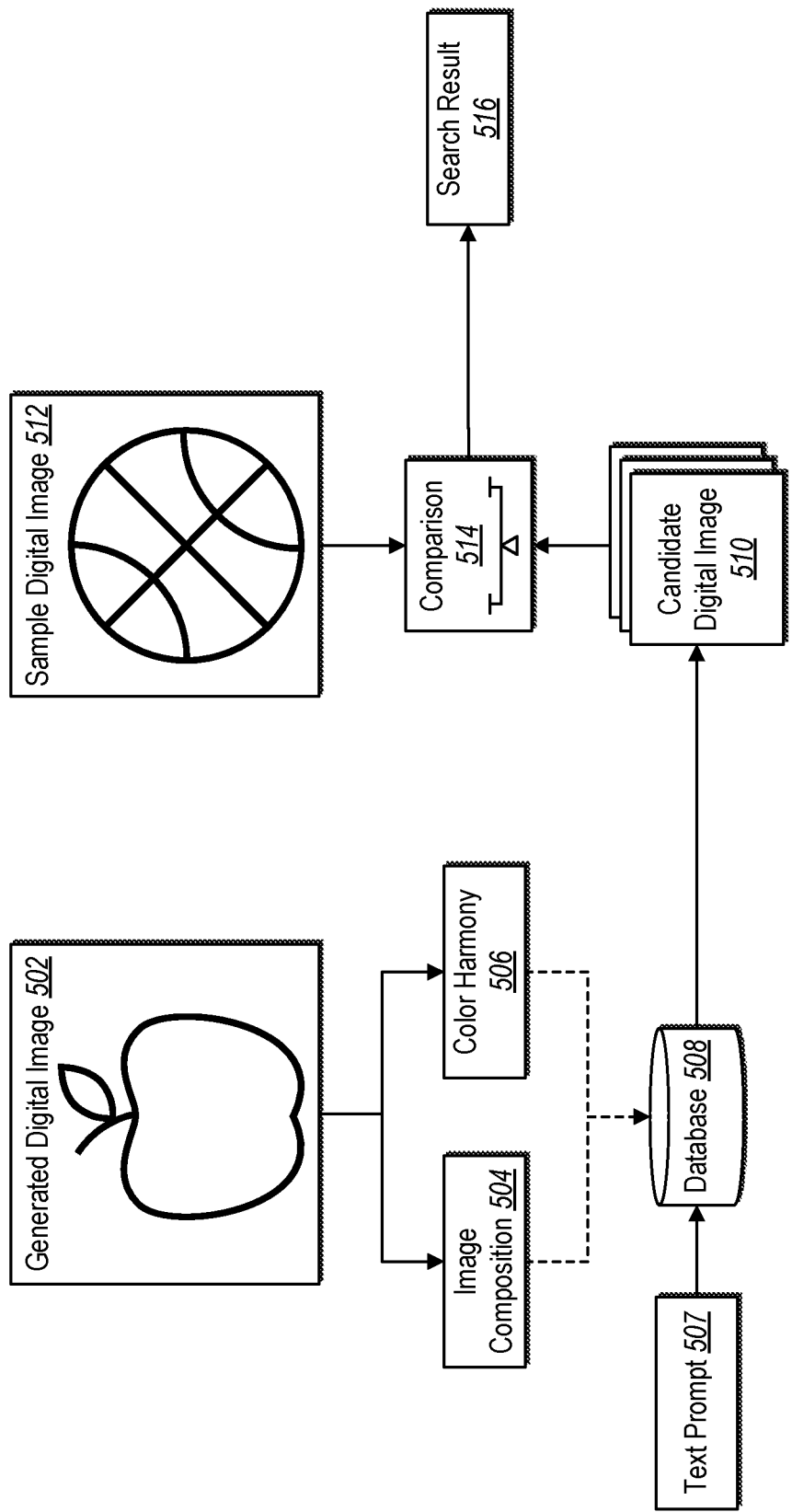
FIG. 5 illustrates an example diagram for generating search results from a generated digital image in accordance with one or more embodiments.

As mentioned above, in certain embodiments, the image context modification system 102 performs a visual image search to identify images corresponding to a text prompt and/or a sample image. In particular, the image context modification system 102 performs an image search by identifying digital images corresponding to a color harmony and/or an image composition of a sample digital image. FIG. 5 illustrates an example diagram for identifying digital images reflecting a color harmony and/or an image composition of a sample digital image in accordance with one or more embodiments.

As illustrated in FIG. 5, the image context modification system 102 generates a generated digital image 502. As described herein, the image context modification system 102 generates the generated digital image 502 using a diffusion neural network to preserve color harmony and image composition from a sample digital image 512 (while also matching content from a text prompt). In addition, the image context modification system 102 searches a database 508 to identify candidate digital images (e.g., the candidate digital image 510) that resemble or match the generated digital image 502. In some cases, the image context modification system 102 searches the database 508 using the generated digital image 502 for a visual image search to find images that depict similar content.

In these or other cases, the image context modification system 102 utilizes image composition 504 and/or color harmony 506 as search parameters for a visual image search. For example, the image context modification system 102 searches the database 508 according to a text prompt 507 to identify the candidate digital image 510 that depicts content indicated by the text prompt 507 and that also reflects the image composition 504 and/or the color harmony 506 of the generated digital image 502. In some embodiments, the image context modification system 102 identifies a number of candidate digital images that correspond to the text prompt 507 as well as the color harmony 506 and/or the image composition 504.

To further narrow the search and determine more accurate search results, the image context modification system 102 further performs a comparison 514. To elaborate, the image context modification system 102 compares the candidate digital image 510 (and other candidate digital images in turn) with the sample digital image 512. Indeed, the image context modification system 102 compares the candidate digital image 510 with the sample digital image 512 initially used as a basis for generating the generated digital image 502. In some cases, even though the generated digital image 502 is based on the color harmony and image composition of the sample digital image 512, the image composition 504 and the color harmony 506 of the generated digital image 502 are not perfectly preserved from the sample digital image 512 and some variation may occur. Accordingly, to refine search results, the image context modification system 102 compares candidate digital images with the sample digital image 512 to identify a subset of candidate digital images that reflect a color harmony and/or an image composition that resemble (e.g., is within a threshold similarity of) those of the sample digital image 512. The image context modification system 102 thus generates the search result 516 by selecting the subset of candidate digital images based on the comparison 514.

Figure 6:
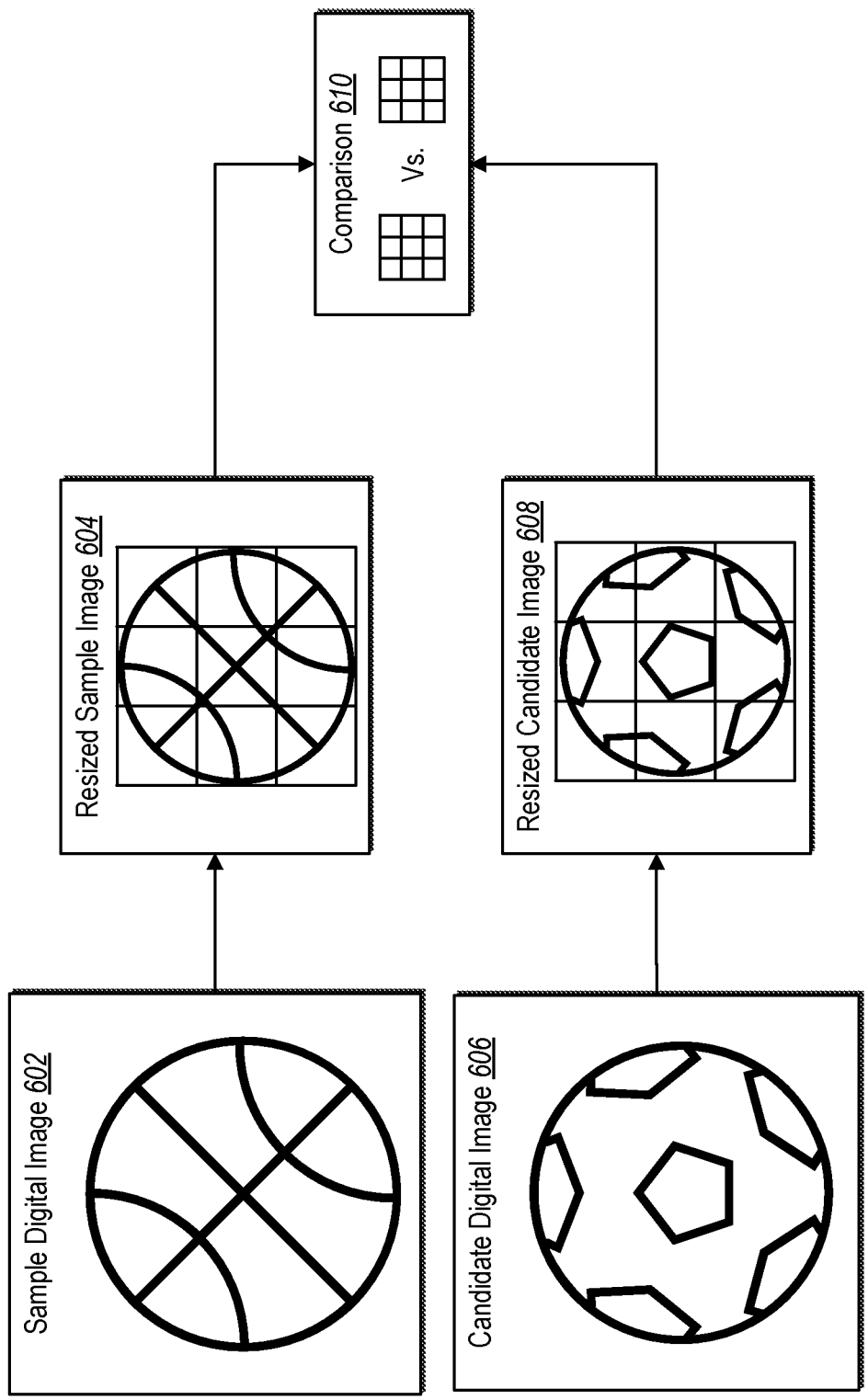
FIG. 6 illustrates an example diagram for comparing digital images for determining search results in accordance with one or more embodiments.

As just mentioned, in certain embodiments, the image context modification system 102 compares candidate digital images with a sample digital image as part of generating search results. In particular, the image context modification system 102 compares pixels of a candidate digital image with pixels of a sample digital image to determine whether the candidate digital image belongs as part of a search result. FIG. 6 illustrates an example diagram of comparing a candidate digital image with a sample digital image in accordance with one or more embodiments.

As illustrated in FIG. 6, the image context modification system 102 identifies or receives a sample digital image 602. As shown, the sample digital image 602 depicts a basketball. In addition, the image context modification system 102 identifies a candidate digital image 606 as a potential image to include within a search result. Indeed, the image context modification system 102 identifies the candidate digital image 606 as a digital image corresponding to a text prompt and/or a generated digital image as a candidate for a search result. As shown, the candidate digital image 606 depicts a soccer ball.

As further illustrated in FIG. 6, the image context modification system 102 performs a comparison 610. In particular, the image context modification system 102 compares the sample digital image 602 with the candidate digital image 606. More specifically, the image context modification system 102 compares a resized sample image 604 with a resized candidate image 608. For example, the image context modification system 102 resizes the sample digital image 602 and the candidate digital image 606 using an image grid that includes a plurality of grid sections (e.g., a 3×3 grid, a 5×5 grid, a 9×9 grid, or some other size) defining coordinates for the resized images. The image context modification system 102 thus fits the image grid to the sample digital image 602 and the candidate digital image 606 to generate the resized versions.

As part of resizing the images, the image context modification system 102 combines (e.g., averages) pixel values in corresponding portions of the original images (e.g., pixels within the sample digital image 602 and the candidate digital image 606 corresponding to respective grid sections) so that each coordinate location in the resized images, as defined by the image grid, has a single color (a single set of pixel values) derived from a set of pixels from the original version. In some cases, the image context modification system 102 utilizes Lanczos sampling (or some other kind of sampling) to combine image pixel values or sample certain values to use as representative for coordinates of the image gride. Thus, in some cases, the image context modification system 102 resizes the sample digital image 602 and the candidate digital image 606 from their original resolutions to a resolution defined by the image grid (e.g., 5×5 pixels or some other grid size).

Additionally, the image context modification system 102 performs the comparison 610 by comparing pixel values in like grid coordinates. More specifically, the image context modification system 102 compares the upper-left grid section of the resized sample image 604 with the upper-left grid section of the resized candidate image 608. The image context modification system 102 further repeats the comparison process on coordinate-wise basis in this fashion. In some cases, the image context modification system 102 compares the coordinate-wise pixels by determining differences between pixel values and determining a least sum of differences across the entire image grid (or across all sections). In some embodiments, the image context modification system 102 determines an absolute value of the (sum of the) coordinate-wise differences as a similarity metric for the candidate digital image 606. The image context modification system 102 thus selects a candidate digital image with a highest similarity metric or selects a number of candidate digital images that satisfy a threshold similarity metric to include within a search result.

Figure 7:
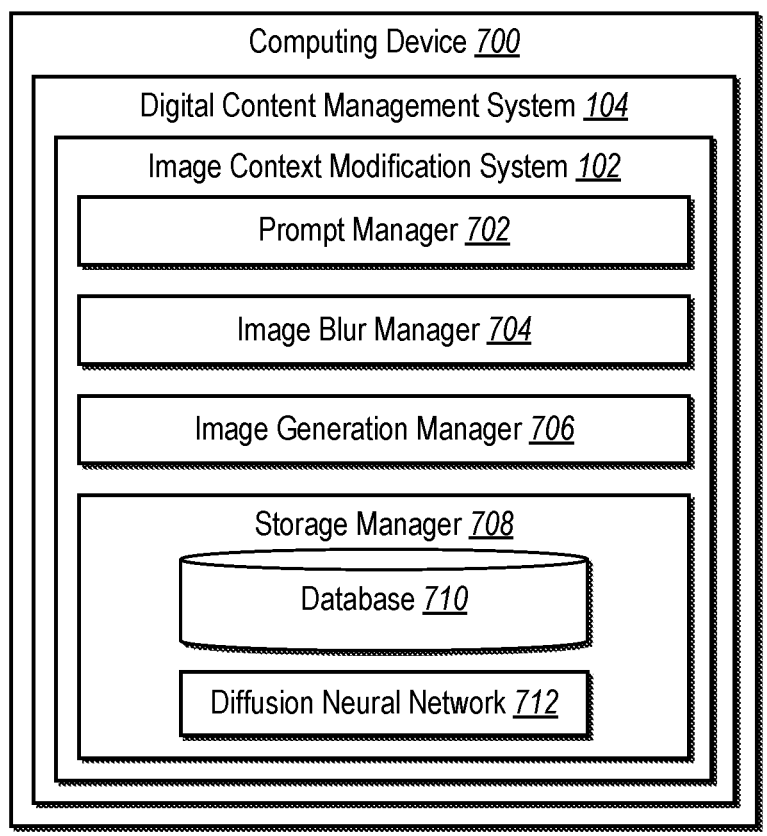
FIG. 7 illustrates an example schematic diagram of an image context modification system in accordance with one or more embodiments.

Looking now to FIG. 7, additional detail will be provided regarding components and capabilities of the image context modification system 102. Specifically, FIG. 7 illustrates an example schematic diagram of the image context modification system 102 on an example computing device 700 (e.g., one or more of the client device 108 and/or the server(s) 104). As shown in FIG. 7, the image context modification system 102 includes a prompt manager 702, an image blur manager 704, an image generation manager 706, and a storage manager 708.

As just mentioned, the image context modification system 102 includes a prompt manager 702. In particular, the prompt manager 702 manages, maintains, receives, detects, analyzes, or processes a prompt from a client device. For example, the prompt manager 702 receives a text prompt defining image content or subject matter for generating or searching for digital images.

As illustrated, the image context modification system 102 also includes an image blur manager 704. In particular, the image blur manager 704 blurs, obscures, obfuscates, resizes, or pixelates a digital image. For example, the image blur manager 704 blurs a sample digital image to generate a blurred version of the sample digital image that retains the color harmony and image composition of the sample image while removing or obscuring the depicted image content or contextual cues in the image. In some cases, the image blur manager 704 utilizes a blur kernel to blur a digital image to use as noise for a diffusion neural network.

Additionally, the image context modification system 102 includes an image generation manager 706. In particular, the image generation manager 706 manages, maintains, generates, produces, or modifies digital images utilizing a diffusion neural network. For example, the image generation manager 706 utilizes a diffusion neural network to denoise a blurred digital image toward a prompt vector of a text prompt, thus generating a new or modified digital image that reflects a color harmony and an image composition of the blurred digital image in the frame of entirely new content or subject matter (e.g., where the content matches the text prompt). In some cases, the image generation manager 706 further searches an image database (e.g., the database 710) to identify candidate digital images and/or images for search results by performing a visual image search using an image grid to compare pixels of corresponding grid coordinates, as described herein.

The image context modification system 102 further includes a storage manager 708. The storage manager 708 operates in conjunction with the other components of the image context modification system 102 and includes one or more memory devices such as the database 710 (e.g., the database 114) that stores various data such as digital images and neural networks. In some cases, the storage manager 708 also manages or maintains a diffusion neural network 712 for modifying or generating digital images using one or more components of the image context modification system 102 as described above.

In one or more embodiments, each of the components of the image context modification system 102 are in communication with one another using any suitable communication technologies. Additionally, the components of the image context modification system 102 are in communication with one or more other devices including one or more client devices described above. It will be recognized that although the components of the image context modification system 102 are shown to be separate in FIG. 7, any of the subcomponents may be combined into fewer components, such as into a single component, or divided into more components as may serve a particular implementation. Furthermore, although the components of FIG. 7 are described in connection with the image context modification system 102, at least some of the components for performing operations in conjunction with the image context modification system 102 described herein may be implemented on other devices within the environment.

The components of the image context modification system 102 include software, hardware, or both. For example, the components of the image context modification system 102 include one or more instructions stored on a computer-readable storage medium and executable by processors of one or more computing devices (e.g., the computing device 700). When executed by the one or more processors, the computer-executable instructions of the image context modification system 102 cause the computing device 700 to perform the methods described herein. Alternatively, the components of the image context modification system 102 comprise hardware, such as a special purpose processing device to perform a certain function or group of functions. Additionally, or alternatively, the components of the image context modification system 102 include a combination of computer-executable instructions and hardware.

Furthermore, the components of the image context modification system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the image context modification system 102 may be implemented as part of a stand-alone application on a personal computing device or a mobile device. Alternatively, or additionally, the components of the image context modification system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, FIREFLY®, and INDESIGN®. "ADOBE," "ADOBE EXPERIENCE MANAGER," "CREATIVE CLOUD," "PHOTOSHOP," "LIGHTROOM," "FIREFLY" and "INDESIGN" are either registered trademarks or trademarks of Adobe Inc. in the United States and/or other countries.

FIGS. 1-7 the corresponding text, and the examples provide a number of different systems, methods, and non-transitory computer readable media for generating a digital image using a diffusion neural network change image content while preserving image composition and color harmony. In addition to the foregoing, embodiments can also be described in terms of flowcharts comprising acts for accomplishing a particular result. For example, FIGS. 8-9 illustrate flowcharts of example sequences or series of acts in accordance with one or more embodiments.

Figure 8:
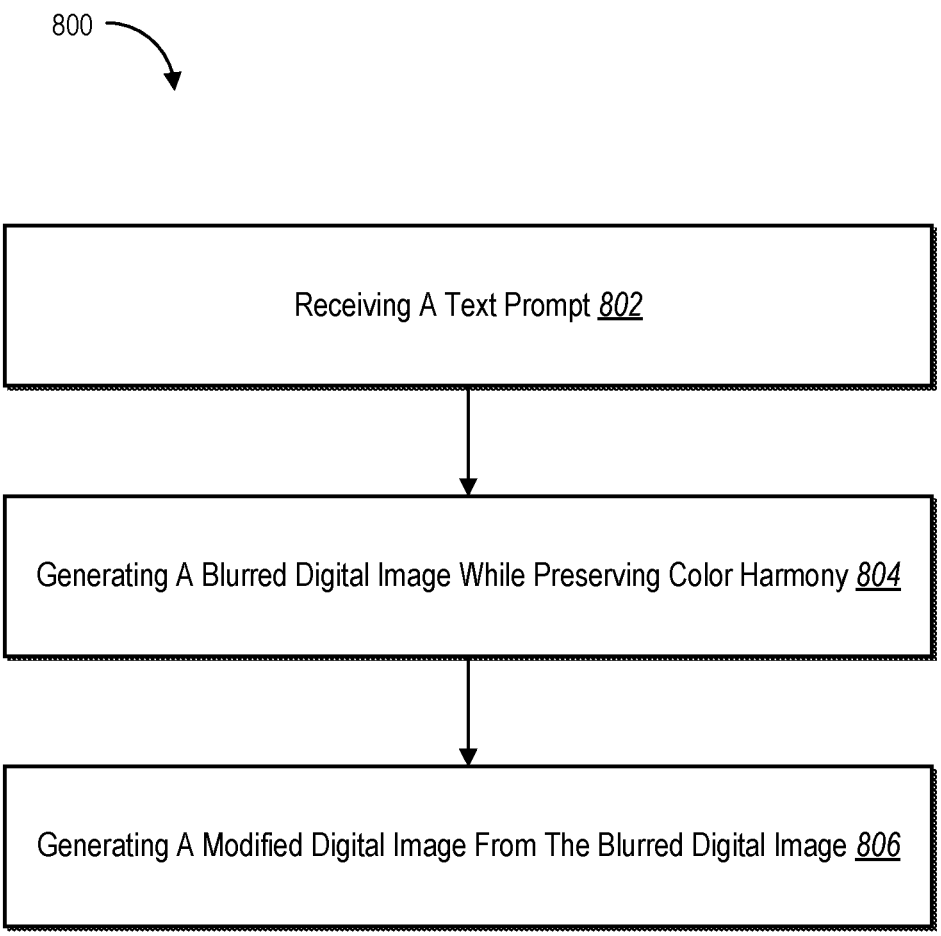
FIG. 8 illustrates an example flowchart of a series of acts for generating a digital image using a diffusion neural network to preserve color harmony and/or image composition while matching a text prompt in accordance with one or more embodiments.
Figure 9:
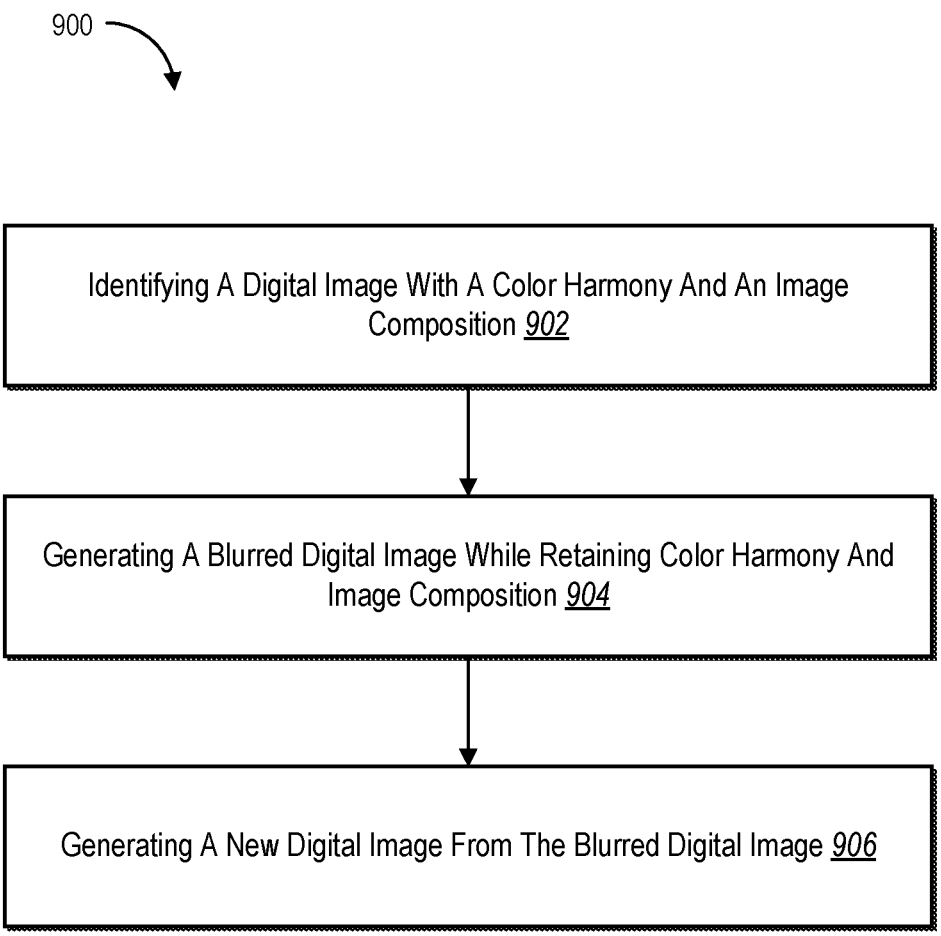
FIG. 9 illustrates an example flowchart of a series of acts for generating a digital image using a diffusion neural network to preserve color harmony and/or image composition in accordance with one or more embodiments.

While FIGS. 8-9 illustrate acts according to a particular embodiment, alternative embodiments may omit, add to, reorder, and/or modify any of the acts shown in FIGS. 8-9. The acts of FIGS. 8-9 can be performed as part of a method. Alternatively, a non-transitory computer readable medium can comprise instructions, that when executed by one or more processors, cause a computing device to perform the acts of FIGS. 8-9. In still further embodiments, a system can perform the acts of FIGS. 8-9. Additionally, the acts described herein may be repeated or performed in parallel with one another or in parallel with different instances of the same or other similar acts.

FIG. 8 illustrates an example series of acts 800 for generating a digital image using a diffusion neural network change image content to match a text prompt while preserving image composition and color harmony. In particular, the series of acts 800 includes an act 802 of receiving a text prompt. For example, the act 802 involves receiving, via user input, a text prompt defining query image content and a sample digital image depicting a color harmony. In addition, the series of acts 800 includes an act 804 of generating a blurred digital image while preserving color harmony. For example, the act 804 involves generating a blurred digital image by blurring pixels of the sample digital image while preserving the color harmony. In addition, the series of acts 800 includes an act 806 of generating a modified digital image from the blurred digital image. For example, the act 806 involves generating, utilizing a diffusion neural network, a modified digital image depicting the query image content having the color harmony of the sample digital image by denoising the blurred digital image toward a noise vector of the text prompt.

In some embodiments, the sample digital image further depicts an image composition defining an arrangement of visual elements within the sample digital image. In these or other embodiments the series of acts 800 includes an act of generating the blurred digital image comprises blurring pixels of the sample digital image while preserving the color harmony and the image composition. In some implementations, the series of acts 800 includes an act of searching a digital image repository by performing a visual image search according to the color harmony and an act of, based on searching the digital image repository, identifying a plurality of candidate digital images that resemble the color harmony.

In one or more embodiments, the series of acts 800 includes an act of selecting a subset of candidate digital images from the plurality of candidate digital images identified by searching the digital image repository using the visual image search. In some cases, the series of acts 800 includes an act of comparing respective color harmonies of the subset of candidate digital images with the color harmony of the sample digital image. In the same or other cases, the series of acts 800 includes an act of selecting, as a search result for the visual image search, one or more candidate digital images from the subset of candidate digital images according to comparing the respective color harmonies.

In certain implementations, the series of acts 800 includes an act of generating, according to an image grid comprising a plurality of grid sections, a resized sample digital image from the sample digital image and a resized candidate digital image from a candidate digital image among the subset of candidate digital images. In some cases, the series of acts 800 includes an act of comparing pixels values of a grid section within the resized sample digital image with pixels values of a corresponding grid section within the resized candidate digital image. In one or more embodiments, the series of acts 800 includes an act of modifying a diffusion seed that initializes the diffusion neural network for generating modified digital images. In certain cases, the series of acts 800 includes an act of, based on modifying the diffusion seed, generating, utilizing diffusion neural network with the blurred digital image as noise, an additional digital image depicting additional image content corresponding to the text prompt while still reflecting the color harmony of the sample digital image.

In one or more embodiments, the series of acts 800 includes acts of generating the noise vector from the text prompt and utilizing the diffusion neural network to denoise the blurred digital image toward the noise vector by generating intermediate digital images at successive iterations that progressively improve in depicting the query image content.

FIG. 9 illustrates an example series of acts 900 for generating a new digital image using a diffusion neural network to generate new image content while preserving color harmony and image composition from a sample digital image. In particular, the series of acts 900 includes an act 902 of identifying a digital image with a color harmony and an image composition. For example, the act 902 involves identifying a digital image depicting initial image content reflecting a color harmony defining colors within the digital image and an image composition defining an arrangement of visual elements within the digital image. In some embodiments, the series of acts 900 includes an act 904 of generating a blurred digital image while retaining color harmony and image composition. For example, the act 904 involves generating a blurred digital image by blurring pixels of the digital image to obscure the initial image content while retaining the color harmony and the image composition. In addition, the series of acts 900 includes an act 906 of generating a new digital image from the blurred digital image. For example, the act 906 involves generating, utilizing a diffusion neural network with the blurred digital image as initial noise, a new digital image depicting new image content reflecting the color harmony and the image composition of the digital image.

In one or more embodiments, the series of act 900 includes an act of generating the blurred digital image by blurring pixels of the digital image using a blur function that obscures the initial image content while retaining color themes across regions of the digital image and retaining the arrangement of visual elements within the digital image. In some implementations, the series of acts 900 includes an act of searching a digital image repository using the color harmony and the image composition of the new digital image as search parameters. In some embodiments, the series of acts 900 includes an act of, based on searching the digital image repository, identifying a subset of candidate digital images with color harmonies and image compositions corresponding to the color harmony and the image composition of the new digital image. Further, in some cases, the series of acts 900 includes an act of selecting, as part a search result, a candidate digital image from the subset of candidate digital images reflecting a color harmony within a threshold similarity of the color harmony of the digital image and an image composition within a threshold similarity of the image composition of the digital image.

In certain implementations, the series of acts 900 includes an act of receiving a text prompt from a client device within an image generation interface for requesting image generation, wherein the text prompt defines query image content and an act of generating the new digital image by utilizing the diffusion neural network to denoise the blurred digital image toward the text prompt. In one or more embodiments, the series of acts 900 includes an act of generating the new digital image by utilizing the diffusion neural network to generate image pixels arranged according to the image composition of the digital image and reflecting the colors defined by the color harmony of the digital image.

In some cases, the series of acts 900 includes an act of modifying a diffusion seed that initializes the diffusion neural network for generating digital images. In these or other cases, the series of acts 900 includes an act of, based on modifying the diffusion seed, utilizing the diffusion neural network to generate an additional digital image depicting additional image content and that reflects the color harmony and the image composition of the digital image. In some embodiments, the series of acts 900 includes an act of providing the new digital image for display within an image generation interface on a client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
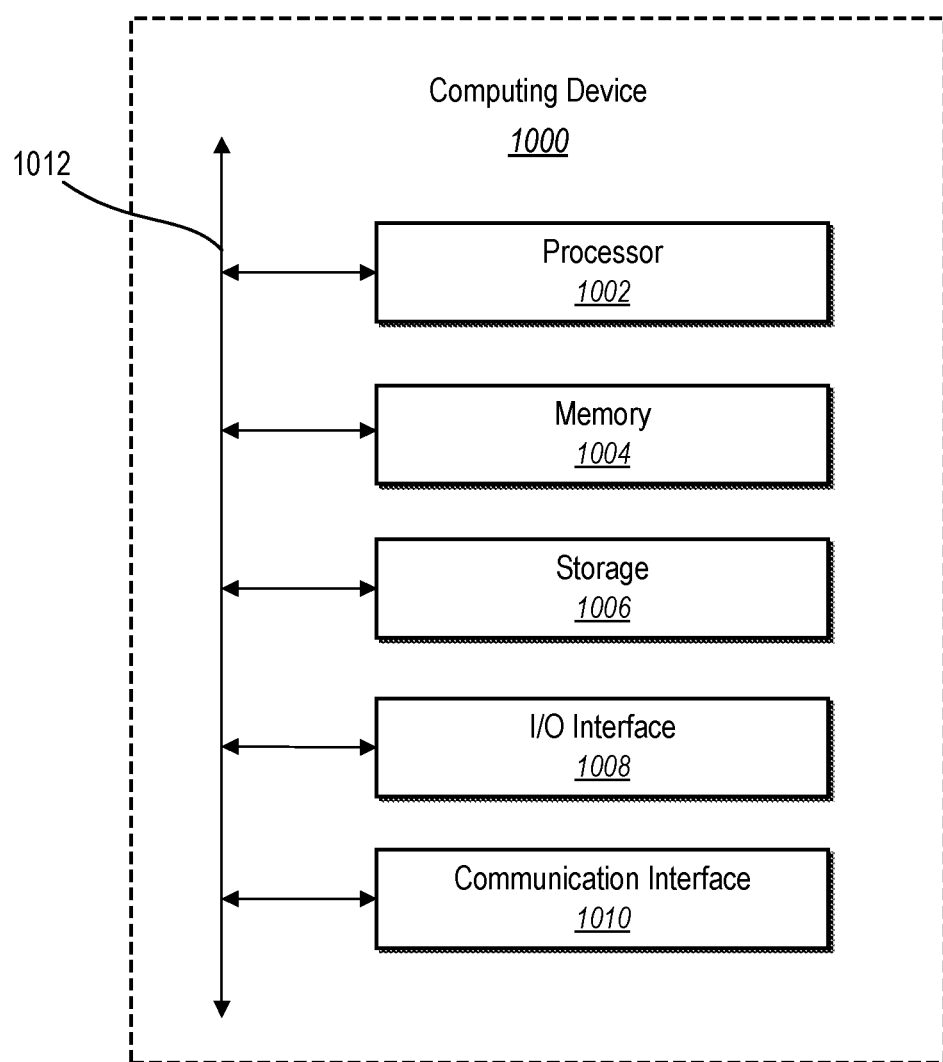
FIG. 10 illustrates a block diagram of an example computing device in accordance with one or more embodiments.

FIG. 10 illustrates, in block diagram form, an example computing device 1000 (e.g., the computing device 700, the client device 108, and/or the server(s) 104) that may be configured to perform one or more of the processes described above. One will appreciate that the image context modification system 102 can comprise implementations of the computing device 1000. As shown by FIG. 10, the computing device can comprise a processor 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
receiving, via user input, a text prompt defining query image content and a sample digital image depicting a color harmony;
generating a blurred digital image by blurring pixels of the sample digital image while preserving the color harmony; and
generating, utilizing a diffusion neural network, a modified digital image depicting the query image content having the color harmony of the sample digital image by denoising the blurred digital image toward a noise vector of the text prompt.

2. The method of claim 1, wherein:
the sample digital image further depicts an image composition defining an arrangement of visual elements within the sample digital image; and
generating the blurred digital image comprises blurring pixels of the sample digital image while preserving the color harmony and the image composition.

3. The method of claim 1, further comprising:
searching a digital image repository by performing a visual image search according to the color harmony; and
based on searching the digital image repository, identifying a plurality of candidate digital images that resemble the color harmony.

4. The method of claim 3, further comprising:
selecting a subset of candidate digital images from the plurality of candidate digital images identified by searching the digital image repository using the visual image search;
comparing respective color harmonies of the subset of candidate digital images with the color harmony of the sample digital image; and
selecting, as a search result for the visual image search, one or more candidate digital images from the subset of candidate digital images according to comparing the respective color harmonies.

5. The method of claim 4, wherein comparing the respective color harmonies comprises:
generating, according to an image grid comprising a plurality of grid sections, a resized sample digital image from the sample digital image and a resized candidate digital image from a candidate digital image among the subset of candidate digital images; and
comparing pixels values of a grid section within the resized sample digital image with pixels values of a corresponding grid section within the resized candidate digital image.

6. The method of claim 1, further comprising:
modifying a diffusion seed that initializes the diffusion neural network for generating modified digital images; and
based on modifying the diffusion seed, generating, utilizing diffusion neural network with the blurred digital image as noise, an additional digital image depicting additional image content corresponding to the text prompt while still reflecting the color harmony of the sample digital image.

7. The method of claim 1, wherein the modified digital image comprises:
generating the noise vector from the text prompt; and
utilizing the diffusion neural network to denoise the blurred digital image toward the noise vector by generating intermediate digital images at successive iterations that progressively improve in depicting the query image content.

8. A system comprising:
a memory component; and
one or more processing devices coupled to the memory component, the one or more processing devices to perform operations comprising:
identifying a digital image depicting initial image content reflecting a color harmony defining colors within the digital image and an image composition defining an arrangement of visual elements within the digital image;
generating a blurred digital image by blurring pixels of the digital image to obscure the initial image content while retaining the color harmony and the image composition; and
generating, utilizing a diffusion neural network with the blurred digital image as initial noise, a new digital image depicting new image content reflecting the color harmony and the image composition of the digital image.

9. The system of claim 8, wherein generating the blurred digital image comprises blurring pixels of the digital image using a blur function that obscures the initial image content while retaining color themes across regions of the digital image and retaining the arrangement of visual elements within the digital image.

10. The system of claim 8, wherein the operations further comprise:
searching a digital image repository using the color harmony and the image composition of the new digital image as search parameters;
based on searching the digital image repository, identifying a subset of candidate digital images with color harmonies and image compositions corresponding to the color harmony and the image composition of the new digital image; and
selecting, as part a search result, a candidate digital image from the subset of candidate digital images reflecting a color harmony within a threshold similarity of the color harmony of the digital image and an image composition within a threshold similarity of the image composition of the digital image.

11. The system of claim 8, wherein the operations further comprise:
receiving a text prompt from a client device within an image generation interface for requesting image generation, wherein the text prompt defines query image content; and
generating the new digital image by utilizing the diffusion neural network to denoise the blurred digital image toward the text prompt.

12. The system of claim 8, wherein generating the new digital image comprises utilizing the diffusion neural network to generate image pixels arranged according to the image composition of the digital image and reflecting the colors defined by the color harmony of the digital image.

13. The system of claim 8, wherein the operations further comprise:
modifying a diffusion seed that initializes the diffusion neural network for generating digital images; and
based on modifying the diffusion seed, utilizing the diffusion neural network to generate an additional digital image depicting additional image content and that reflects the color harmony and the image composition of the digital image.

14. The system of claim 8, further comprising providing the new digital image for display within an image generation interface on a client device.

15. A non-transitory computer readable medium storing instructions which, when executed by a processing device, cause the processing device to perform operations comprising:
- receiving, via user input, a text prompt defining query image content and a sample digital image depicting a color harmony;
- generating a blurred digital image by blurring pixels of the sample digital image while preserving the color harmony; and
- generating, utilizing a diffusion neural network, a modified digital image depicting the query image content having the color harmony of the sample digital image by denoising the blurred digital image toward a noise vector of the text prompt.

16. The non-transitory computer readable medium of claim 15, wherein generating the blurred digital image comprises blurring pixels of the sample digital image to obscure image content depicted within the sample digital image while preserving the color harmony.

17. The non-transitory computer readable medium of claim 15, wherein the operations further comprise:
- searching a digital image repository by performing a visual image search utilizing the modified digital image; and
- based on searching the digital image repository, identifying a plurality of candidate digital images that resemble the modified digital image.

18. The non-transitory computer readable medium of claim 17, wherein the operations further comprise:
- comparing, from among a plurality of candidate digital images similar to the modified digital image, a color harmony of a candidate digital image with the color harmony of the sample digital image; and
- determining that the color harmony of the candidate digital image is within a threshold similarity of the color harmony of the sample digital image.

19. The non-transitory computer readable medium of claim 18, wherein comparing the color harmony of the candidate digital image with the color harmony of the sample digital image comprises:
- generating a resized sample digital image from the sample digital image and a resized candidate digital image from the candidate digital image; and
- comparing pixels values of the resized sample digital image with pixels values of the resized candidate digital image.

20. The non-transitory computer readable medium of claim 15, wherein generating the blurred digital image comprises blurring pixels of the sample digital image to obscure an image content of the sample digital image while preserving the color harmony.

* * * * *